Aug. 8, 1961
R. A. EAMES
2,995,397
COACH SUPPORT STRUCTURE
Filed Sept. 3, 1959
3 Sheets-Sheet 2
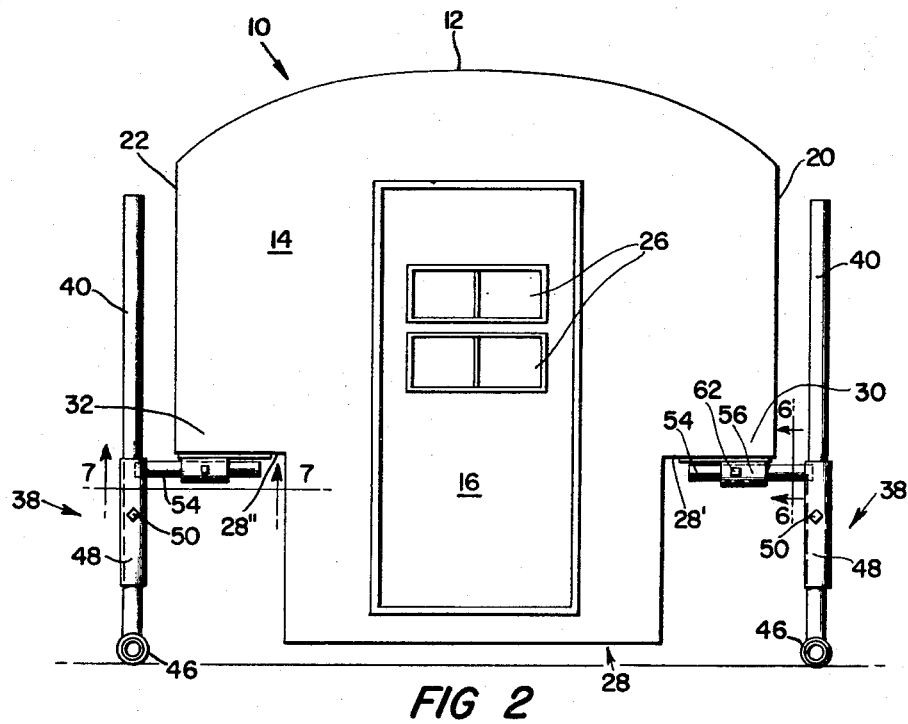
FIG 2
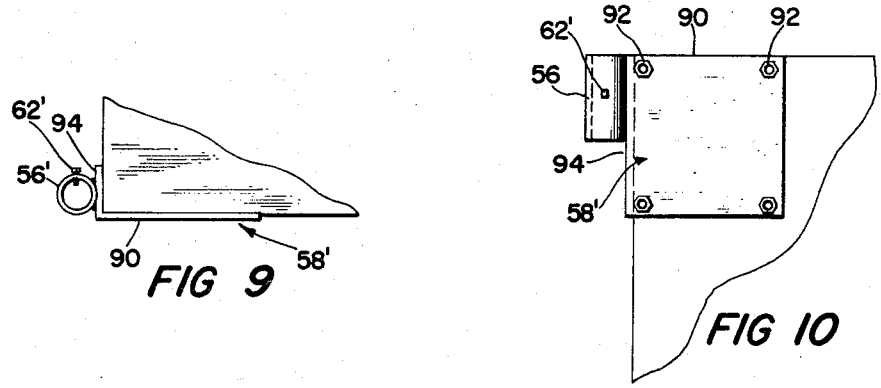
FIG 9
FIG 10
INVENTOR
ROBERT A. EAMES
BY Harold T. Stowell
Harold L. Stowell
ATTORNEYS Aug. 8, 1961 R. A. EAMES 2,995,397
COACH SUPPORT STRUCTURE
Filed Sept. 3, 1959 3 Sheets-Sheet 3
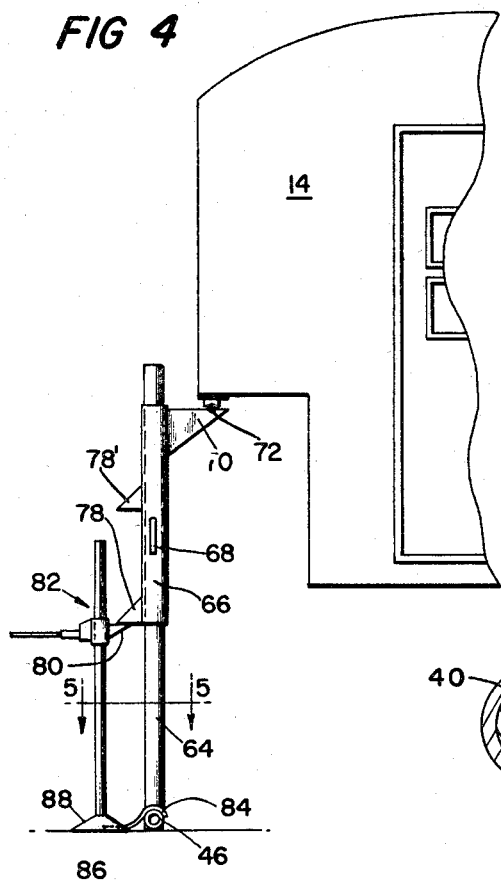
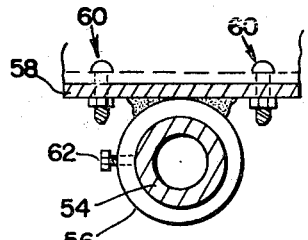
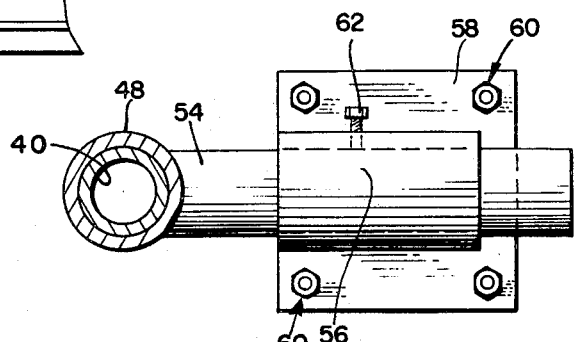
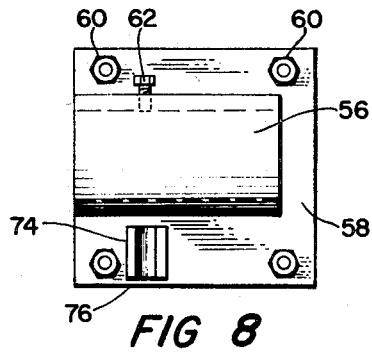
INVENTOR
ROBERT A. EAMES
BY Harold T. Stowell
   Harold L. Stowell
ATTORNEYS

United States Patent Office 2,995,397
Patented Aug. 8, 1961

2,995,397
COACH SUPPORT STRUCTURE
Robert A. Eames, 603 5th Ave., Salt Lake City, Utah
Filed Sept. 3, 1959, Ser. No. 837,917
1 Claim. (Cl. 296—23)

This invention relates to a ground support structure for a wheel-less coach and to lift means asociated therewith.

It is a particular object of the present invention to provide a retractable ground support structure for a coach adapted to be transported on a bed of a vehicle whereby the coach may be supported from the ground to enable the transporting vehicle to be positioned in transporting relationship to the coach and for removing the coach from the body of the transporting vehicle.

A further object is to provide such a device which includes lifting jack means associated with the retractable ground engaging support structure which is simple as to its parts; relatively inexpensive to manufacture; and sturdy and convenient to use.

A further object is to provide such a device that is carried by the coach when in the retracted position for instant use when the coach is to be removed from the body of the transporting vehicle.

A further object is to provide such a device that can be operated by one person in a few minutes' time.

Another object is to provide a retractable ground support structure which may be employed on various types of coaches without interference with freedom of backing the transporting vehicle under the coach or in pulling the vehicle out from under the coach.

As employed herein and in the claims appended hereto, the term "coach" means a portable house or sheltertype trailer without wheels that is adapted to be transported on the bed of a truck and, in particular, on "pickup" trucks. In general, such coaches weight about 1,000 pounds and it generally requires about six men to load or to unload such a shelter from the bed of a vehicle. Coaches are often employed as shelters for campers and hunters and are also employed in cross-country drives and the like and have become very popular as they do not create driving problems as often are encountered with wheeled trailer-type shelter structures.

The present invention generally comprises a retractable ground support structure for a coach adapted to be transported on a bed of a vehicle including in combination a coach structure having a bottom portion, a plurality of spaced generally vertically projecting sleeves carried by said bottom portion of said coach, said sleeve being positioned along at least a pair of opposed sides of said coach, an elongate member slidably received in each of said sleeves, releasable lock means cooperating with each complementary sleeve and elongate member for maintaining the elongate member in fixed relationship to its sleeve, and ground engaging lifting means for selectively raising and lowering a side of said coach.

The invention will be more particularly described with reference to the illustrated embodiments thereof wherein:

FIG. 2 is a rear elevational view of a coach and retractable ground support means with the ground support means in the retracted position;

FIG. 3 is a fragmentary side elevational view showing the jack mechanism in position;

FIG. 4 is a fragmentary end elevational view of the lifting structure of the present invention;

FIG. 5 is a true section on line 5—5 of FIG. 4;

FIG. 6 is an enlarged view of one of the support elements of the present invention on line 6—6 of FIG. 2;

FIG. 7 is a fragmentary section substantially on line 7—7 of FIG. 2;

FIG. 8 is a plan view of one of the coach engaging plate structures provided with a lift engaging detent;

FIG. 9 is an enlarged fragmentary end view of a modified form of plate structure of the present invention; and FIG. 10 is a plan view of the plate structure shown in FIG. 9.

Figure 1:
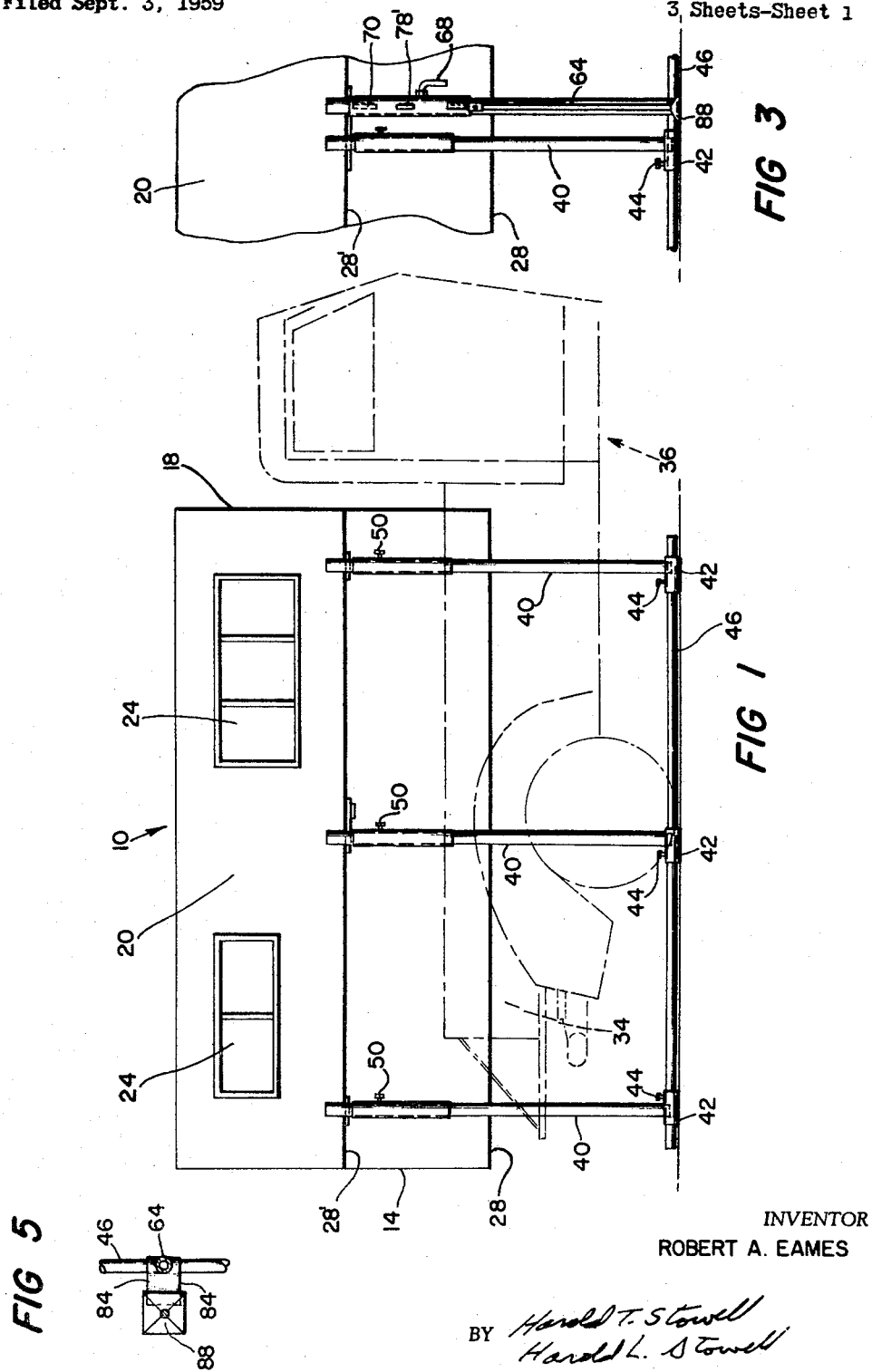
FIG. 1 is a side elevational view of a coach and retractable ground support structure of the invention shown in relationship to a supporting and transporting pickup truck.

Referring to the drawings and, in particular, to FIGS. 1 through 8, 10 generally designates a conventional coach structure adapted to be transported on the bed of a pickup truck. The coach structure includes a roof portion 12; a rear end 14 having a door 16 centrally positioned therein; a front wall 18; and side panels or walls 20 and 22. The coach structure where employed as living quarters may be provided with conventional windows, such as designated at 24 in the side panels and 26 in the door structure. To complete the coach structure, it is provided with a bottom or floor structure 28.

The bottom portion 28 of the coach 10 is offset to provide two wing structures generally designated 30 and 32 having base portions 28' and 28''. The offset form of the base of the coach permits a larger coach structure to be carried on the bed of a pickup truck, as the wing portions 30 and 32 extend above and over the side panels generally designated 34 of the pickup truck 36 illustrated in phantom lines in FIG. 1 of the drawings. The offset nature of the floor or base of the coach also provides greater head room in the center portion of the coach without increasing the overall height of the structure. Preferably the height of the floors 28' and 28'' above the primary floor structure 28 of the coach is such that when the coach is positioned on the bed of a pickup truck, only the base portion 28 is in contact with the truck and the floor portions 28' and 28'' extend above and over the uppermost edge of the side members 34 of the transporting vehicle.

In order to place the coach 10 on the bed of a truck and remove the coach 10 from the bed and to provide support for the coach when it is removed from the bed of the pickup truck, retractable ground engaging support structures generally designated 38 are provided along each side 20 and 22 of the coach.

Each side of the retractable ground support structure of the invention includes at least two elongate load bearing members 40. On smaller, lighter coaches, four load bearing support members 40 may be employed, one at each side corner; however, on larger coaches, for example, the 10-foot length models, a third load bearing elongate support member 40 is employed and positioned substantially intermediate the two end support members as illustrated in FIG. 1. Each of the elongate support members may be satisfactorily constructed of one-inch extra heavy pipe and, in general, a length of about 4'8" has been found to be very satisfactory.

To the base of each of the load bearing standards 40 is welded a sleeve member 42, which sleeve members are provided with tapped openings adapted to receive a pointed set or cap screw 44.

All of the load bearing elongate members 40 along each side of the coach are interconnected by a bottom stringer member generally designated 46. Each bottom stringer member 46 is slidably received in the sleeve elements 42 welded to the lower ends of the load support members 40 on its side of the coach. After the bottom stringer members 46 are positioned within the sleeves 42, as illustrated in FIG. 1 of the drawings, the cap screws 44 are cinched, interlocking each of the vertical support members 40 to their respective stringer members 46.

Each of the support members 40 is slidably received in a sleeve member 48. While the length of the sleeve members 48 is not critical, it has been found that a sleeve length of from about one foot to about 1½ feet provides very satisfactory results. Each of the sleeve members 48 is bored and tapped to receive a locking set-screw 50 whereby the vertical support members 40 may be immobilized relative to their complementary sleeve members 48. While set screw locking means has been illustrated in the drawings as the means for immobilizing each of the load supporting members 40 relative to its complementary sleeve member 48, it is apparent that other forms of locking means may be employed. For example, the sleeve members 48 may be provided with a plurality of bores adapted to mate with a bore in its corresponding vertical member or vice versa whereby a pin may be slipped through the bores to provide vertical adjustment of the ground engaging stringer members 46 relative to the sleeve members 48.

Each of the sleeve members 48 has welded thereto a short rod 54 which rods are adapted to be slidably received in cooperating sleeves 56. Each of the sleeves 56 is secured such as by welding to an adapter plate 58 as more clearly illustrated in FIGS. 6, 7 and 8 of the drawings.

Each of the adapter plates 58 is secured to its floor portion 28' or 28" by, for example, nut-and-bolt assemblies generally designated 60. Further, as illustrated in the drawings, each of the sleeves 56 is bored and tapped to receive a pointed set-screw 62 to immobilize its cooperating extension rod 54 which, in turn, is welded to sleeve members 48 as hereinabove described.

By the foregoing assembly, it will be readily seen that the relative position between the vertical load supporting means 40 and its side of the coach 20 or 22 may be adjusted so that the unit may be employed to retractably support a coach for placement on the bed of various size pickup trucks without interference with the side panels or fenders of the trucks. It will also be seen that through the use of the cooperating sleeves 56 and sleeve receiving members 54, the retractable ground support structures of the present invention may be quickly secured to or removed from the side of a coach. However, as hereinbefore described, it is not necessary to remove the retractable ground support structure when the vehicle is transporting the coach as the structures may be maintained in the position as illustrated in FIG. 4 without interference with driving or the mobility of the pickup truck.

The retractable ground support structure of the present invention also includes lift or jack means whereby the coach structure may be raised from the bed of the vehicle for removal of the truck or lowered to the bed of a truck as desired. The jack structure includes an elongate load bearing member 64 illustrated in FIGS. 3, 4 and 5 of the drawings which is slidably received in a sleeve member 66. The sleeve member is bored and tapped to threadedly receive a locking handle 68 whereby relative movement between the load bearing elongate member 64 and its sleeve portion 66 may be selectively immobilized.

The sleeve 66 has secured adjacent its upper end a bracket member 70 which bracket member has welded thereto a boss element 72. The boss element 72 cooperates with a member 74 having a channel portion 76 formed therein. The member 74 is secured to the exposed face of the centrally positioned plate member 58 on each side of the vehicle whereby the pin 72, when received in the channel portion 76, fixes the position of the lift structure relative to the floor of the coach.

The sleeve member 66 of the lift structure also has secured thereto one or more bracket members designated 78 and 78'. The bracket members 78 and 78' are positioned 180° displaced from the bracket member 70 and are adapted to receive the lift lug 80 of a conventional lift jack generally designated 82.

The lower end of load supporting standard 64 has welded thereto a shaped plate member 84. The plate member 84 is shaped to engage the upper curved surface of the stringer members 46 and to provide a foot portion 86 upon which the jack base 88 rests.

In operation of the device of the invention with the coach positioned on the bed of a truck, set-screws 50 are backed off to permit each of the load supporting standards 40 and their interconnected stringer member 46 to drop downwardly and contact the ground on each side of the vehicle. Then the set-screws 50 along one side of the vehicle are cinched and the lift mechanism is positioned on the opposite side of the vehicle with the pin 72 of the bracket member 70 engaging the channel 76 of lug plate 74 and the curved base plate 84 positioned as illustrated in FIG. 3 of the drawings. The jack is then actuated, causing that side of the vehicle to move or pivot upwardly a few inches. As soon as that side of the vehicle has been lifted to provide clearance between the floor of the coach along that side of the vehicle bed, the set-screws 50 are cinched and the jack 82 is lowered. The coach is then supported above the bed of the vehicle on that side by the load supporting members 40 and their cooperating sleeves and bracket elements.

The jack and lift structure is then moved to the opposite side of the vehicle and the above described procedure repeated. With both sides of the coach packed upwardly and supported by the retractable ground support structures of the present invention, the vehicle may be driven from beneath the coach, leaving the coach standing on its retractable support.

To lower the vehicle upon the truck bed, first one side, then the other is lowered by the process of placing the jack under one side of the coach, loosening the set-screws 50 along that side, jacking the side down into contact with the vehicle bed and then removing the jack and repeating the process on the opposite side. With the coach securely seated on the vehicle bed, the retractable ground engaging support structures on each side of the vehicle may be moved upwardly to the position shown in FIG. 2 of the drawings and the coach becomes fully mobile.

By means of the additional bracket member 78', FIG. 4, it is possible, after the vehicle has been removed from beneath the coach, to lower the coach to the ground by repeated step-by-step lowering of each side. As the floor of the coach 28 approaches the ground level, the jack lug 80 engages the uppermost bracket 78' to permit sufficient clearance for operation of the jack.

From the foregoing description, it will be seen that the present invention fully accomplishes the aims and objects hereinbefore set forth whereby a substantially improved retractable ground engaging support structure for a coach adapted to be transported on the body of a vehicle is provided. It will be apparent to those skilled in the art that various modifications may be made in the form of the structures hereinabove described without departing from the scope of the present invention. For example, where the offset nature of the coach body is not sufficient to permit the use of brackets 58 and their attached sleeve members 56 due to insufficient clearance between the upper edge of the vehicle side walls, modified brackets may be employed in accordance with the teachings of the invention. Modified brackets are illustrated in FIGS. 9 and 10.

Referring particularly to FIGS. 9 and 10, modified brackets 58' are illustrated as having an extended flat surface 90 which is bolted to the undersurfaces 28' and 28" of the coach.

Each of the brackets 58' includes a right-angle portion 94 which engage either the front wall 14 or the rear wall 18 of the coach as the case may be. Secured to the angle portions 94 of the brackets 58' are the sleeve members 56' adapted to receive the angular extensions 54 of the vertically extending sleeves 48 as hereinbefore described with reference to FIGS. 1 through 8 of the drawings. Sleeves 56' as is the case with sleeves 56 are bored and tapped to receive locking set-screws 62'. Other than the offset positioning of the sleeves 56' for use on coach and vehicle assemblies where clearance does not permit the use of brackets 58, the two forms of the invention are identical in form and operation.

It is also pointed out on such coaches, and where only two load supporting members are employed on each side of a coach, a plate such as illustrated in FIG. 8 with the lug receiving channel formed therein may be secured to the base on each side of the vehicle intermediate the end legs to insure safe operation of the structures of the present invention.

I claim:

In combination a truck having a bed portion having parallel side panels, a coach adapted to be supported and transported on the bed portion of the truck, said coach having a base portion adapted to rest on the truck bed and a pair of parallel offset base portions adapted to overhang the side panels of the bed of the truck, parallel coach side walls extending vertically upwards from the extended edges of the offset base portions, and retractable ground support structures for the coach comprising at least three spaced plate members secured to each offset base portion along the opposite sides of said coach with at least one of the spaced plate members secured adjacent the corners of the coach, a rigid sleeve secured to each of said plate members with the longitudinal axis of the sleeve directed generally parallel to the offset base portions of the coach and perpendicular to the plane of the side walls thereof, each of said sleeves extending laterally a distance not greater than the plane of said side walls of the coach, a member telescopically received in each of said sleeves, locking means cooperating with each of said sleeves and their corresponding telescopically received members, a second sleeve secured to the extended outer end of each telescopically received member with the longitudinal axis of each of said second sleeve directed generally vertically, elongated support members slidably received in each of said second sleeves, the length of said elongated support members being greater than the distance between said plate members and the ground when the coach is on the truck bed, further releasable locking means cooperating with each second sleeve and its elongated support member for maintaining the elongated support members in any selected fixed relationship to its second sleeve, rigid tie means interconnecting the lower ends of each of said elongated members along each side of the coach, ground engaging lift means for selectively raising and lowering a side of said coach, said lift means including a jack structure, and telescopic extension means cooperating with the lift element of said jack structure and the coach body.

References Cited in the file of this patent

UNITED STATES PATENTS

| 1,122,686 | Clark | Dec. 29, 1914 |
| 1,303,854 | Clark | May 20, 1919 |
| 2,173,076 | Stetson | Sept. 12, 1939 |
| 2,665,938 | McCrossen | Jan. 12, 1954 |
| 2,811,386 | Shaw | Oct. 29, 1957 |
| 2,868,401 | Lelois | Jan. 13, 1959 |
| 2,934,373 | Doty | Apr. 26, 1960 |